(12) United States Patent
Wojnarowski et al.

(10) Patent No.: US 6,302,987 B1
(45) Date of Patent: Oct. 16, 2001

(54) HIGH VOLTAGE POLYMER PROCESSING METHODS AND POWER FEED-THROUGH BUSHING APPLICATIONS

(75) Inventors: Robert John Wojnarowski, Ballston Lake; Clive William Reed, Scotia; Thomas Bert Gorczyca, Schenectady, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/286,329

(22) Filed: Apr. 5, 1999

(51) Int. Cl.[7] ............... B29C 65/52; B29C 65/54; H01B 5/00; H02G 5/02
(52) U.S. Cl. ............... 156/151; 29/525; 156/286; 156/294; 156/305; 156/312; 156/382; 174/72 B; 264/262
(58) Field of Search ............... 156/294, 305, 156/94, 285, 286, 87, 151, 312, 382; 264/262, 36.1, 36.22, 36.15; 29/525, 877; 174/72 B

(56) References Cited

U.S. PATENT DOCUMENTS

| | | | |
|---|---|---|---|
| 3,134,164 | * | 5/1964 | Hocks . |
| 3,498,866 | * | 3/1970 | Kilbane ............... 156/294 |
| 3,662,088 | * | 5/1972 | Wright et al. . |
| 3,778,892 | * | 12/1973 | Ostroski ............... 156/294 |
| 3,784,235 | * | 1/1974 | Kessler et al. ............... 156/294 |
| 3,893,233 | * | 7/1975 | Glover ............... 29/525 |
| 4,063,980 | * | 12/1977 | Trunnell ............... 156/294 |
| 4,280,861 | * | 7/1981 | Schwartz ............... 156/382 |
| 4,445,952 | * | 5/1984 | Reynolds et al. ............... 156/94 |
| 4,661,190 | * | 4/1987 | Gelianas ............... 156/294 |
| 4,908,087 | * | 3/1990 | Murooka et al. ............... 156/382 |
| 5,579,217 | * | 11/1996 | Deam et al. . |
| 5,687,465 | * | 11/1997 | Hinata et al. ............... 156/286 |
| 5,837,090 | * | 11/1998 | Binnie et al. ............... 156/294 |
| 6,015,473 | * | 1/2000 | Rosenberg et al. ............... 156/294 |

FOREIGN PATENT DOCUMENTS

| | | | | |
|---|---|---|---|---|
| 1912635 | * | 9/1970 | (DE) | ............... 156/286 |
| 2271114 | * | 4/1994 | (GB) | . |
| 62-128734 | * | 6/1987 | (JP) | ............... 156/286 |
| 63-067138 | * | 3/1988 | (JP) | ............... 156/286 |
| 63-296934 | * | 12/1988 | (JP) | ............... 156/286 |

* cited by examiner

Primary Examiner—Steven D. Maki
(74) Attorney, Agent, or Firm—Ann M. Agosti; Jill M. Breedlove

(57) ABSTRACT

A method for coupling electrically conductive bushings in a bus, including alternating layers of dielectric material and patterned, electrically conductive bus bars and having through holes therein with each through hole having a surface exposing a portion of a respective one of the bus bars, includes: applying a polymer mixture to the surface of each through hole; inserting the bushings in the respective through holes; and curing the polymer mixture by positioning the bus and bushings in a curing chamber, applying a vacuum to the curing chamber, and applying pressure to reduce voids in the polymer mixture and minimize further void formation.

16 Claims, 5 Drawing Sheets

HIGH VOLTAGE POLYMER PROCESSING METHODS AND POWER FEED-THROUGH BUSHING APPLICATIONS

BACKGROUND OF THE INVENTION

The present invention relates generally to polymer processing techniques and more particularly to a processing system for sealing power feed-through bushings in high voltage (such as 2300 volts and 4160 volts, for example) laminated bus structures.

When through holes are machined in laminated bus structures, the machined surfaces are not perfectly smooth, and voids occur between the later inserted bushings and the bus side walls. These voids can result either during fabrication or after subsequent mechanical assembly, or movement or heat changes, for example. These voids can cause initial electrical failures or may become partial discharge electrical failures on initially good buses as they deteriorate over time, particularly when salt or other contaminants are introduced.

Voids (from air bubbles or cracks, for example) on the order of about 25 micrometers or more in diameter can create electrical partial discharges and lead to electrical failures. The larger the void and the greater the density of voids, the greater the risk of failure.

BRIEF SUMMARY OF THE INVENTION

Thus there is a particular need for a process for manufacturing high voltage electrical laminated bus structures for interconnecting large banks of capacitors, insulated gate bipolar transistors, and other components for large motor drive controllers at low cost and high reliability and for the resultant structures. More specifically, there is a need to electrically seal power feed-through bushings in laminated bus structures such that voids which cause partial discharge are removed and prevented and that contaminates cannot enter and cause long term reliability problems.

Briefly, in accordance with one embodiment of the present invention, voids are reduced from a polymer mixture by applying pressure to destroy or to reduce the size of the voids.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF THE INVENTION

Figure 1:
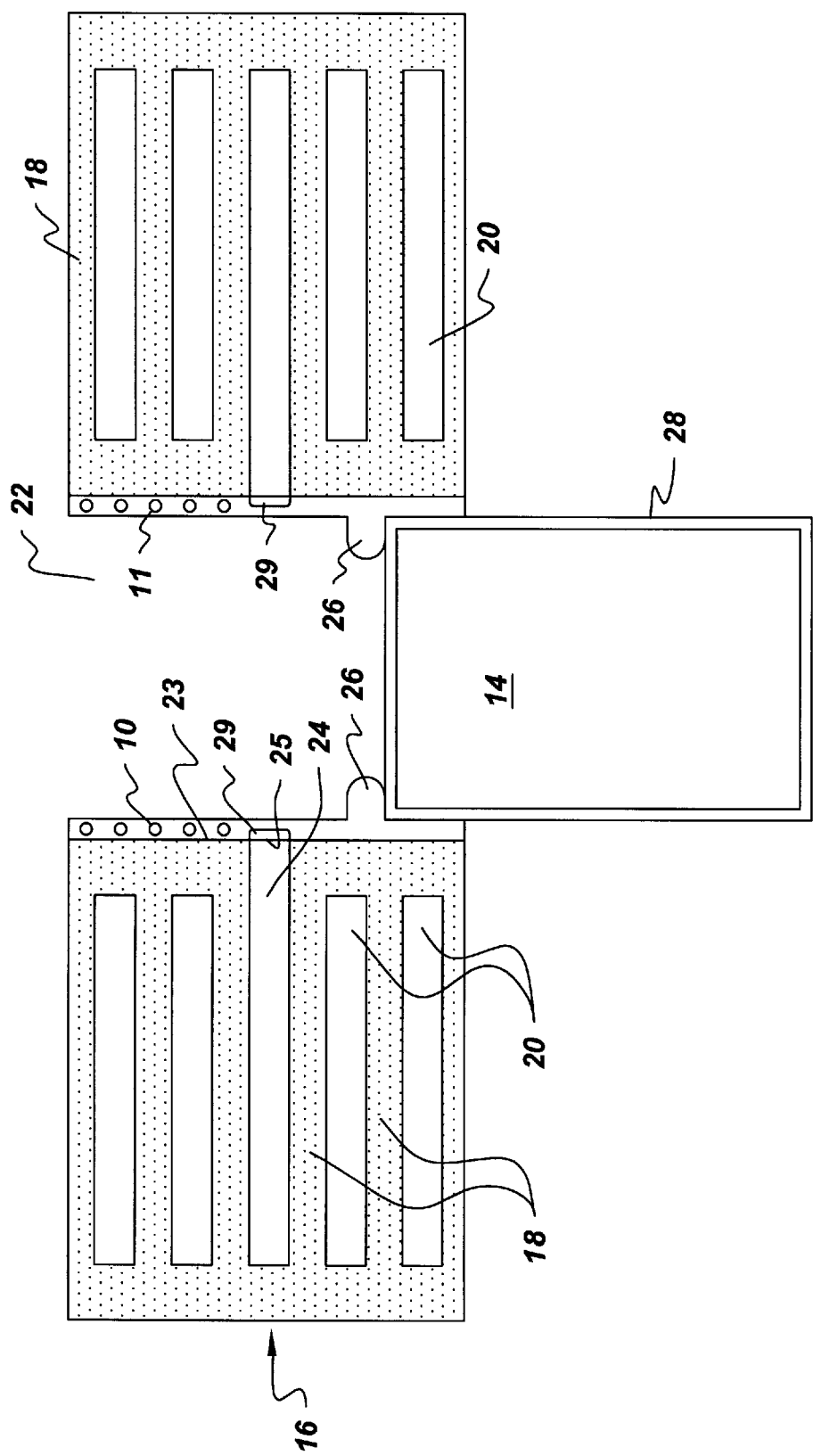
FIG. 1 is a side view of bushing partially inserted in a bus according to one embodiment of the present invention.
Figure 2:
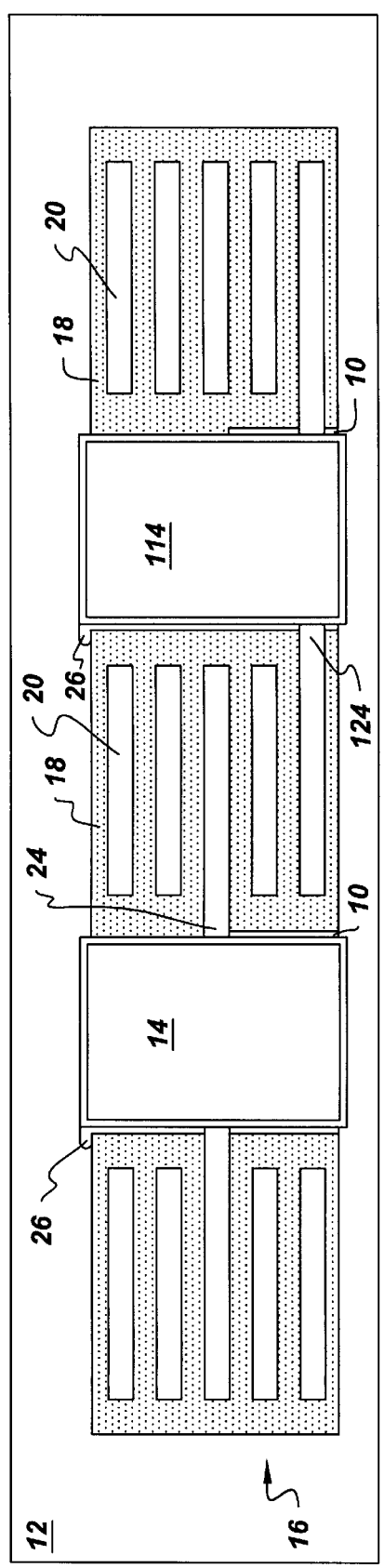
FIG. 2 is a view similar to that of FIG. 1 showing two bushings fully inserted in the bus and positioned in a curing chamber.

FIG. 1 is a side view of bushing 14 partially inserted in a bus 16 according to one embodiment of the present invention, and FIG. 2 is a view similar to that of FIG. 1, showing two bushings fully inserted in the bus and positioned in a curing chamber. Although one bushing is shown in most figures for purposes of illustration, multiple bushings are inserted into a bus.

In one form of the invention, a method for curing a polymer mixture 10, whether in the bushing context or in another context, comprises positioning the polymer mixture in a curing chamber 12 and applying pressure within the chamber to reduce voids 11 in the polymer mixture. In a preferred embodiment, the curing chamber comprises a vacuum chamber.

Polymers that are particularly useful for inclusion in polymer mixture 10 of the present invention, for example, include materials such as epoxies, silicones, polyimides, polyurethanes, and polyesters. Polymer mixture 10 may include other agents such as coupling (adhesion) agents, wetting (surfactant) agents, hardening (curing) agents, flexing (elasticity) agents, and/or filler material for strengthening purposes.

When pressure is applied to an uncured polymer mixture, the pressure breaks or compresses (reduces the size of) air bubbles and any other voids. By destroying or reducing air bubbles to a smaller size, partial discharge performance is greatly enhanced. Thus partial discharges related failures are greatly minimized. Adding vacuum conditions to the process is useful because a vacuum can be used to draw air bubbles to the surface through the side wall areas along the bushing and bus walls (and produce a foam like appearance on the top polymer mixture to air interface). The introduction of pressure can then directly break these surface bubbles in addition to compressing bubbles and voids that are beneath the surface.

When an epoxy is heated, for example, the viscosity of the epoxy drops, and thus air bubbles can rise more easily than at higher viscosities. This heating enhances the breaking and compressing of the bubbles and voids. After the initial drop in viscosity, the epoxy then experiences an increase in viscosity as the epoxy is cured. During curing and increasing viscosity, void reformation and/or expansion can be suppressed by pressure conditions and the resultant cured polymer mixture can be substantially void free. "Substantially void free" is meant to encompass a polymer mixture that has no voids of a size that will experience internal partial discharges under normal or transient applied voltages. Typically, for example, voids that are about 25 micrometers or less at ambient pressure do not experience internal partial discharges.

When a silicone is used instead of an epoxy, the partial discharge capabilities can be increased, but more degassing will be required to reduce air bubbles and other voids. In such embodiments, it may be useful to have several cycles of reduced viscosity and pressure applications.

In one embodiment, vacuum and pressure conditions are alternated such that, for example, vacuum is applied for a time ranging from about one minute to about three minutes (at or below 100 microns of pressure), sufficient pressure is applied for about one minute for void compression, and then the two step process is cycled one or more times ending with a pressure step during the final cure. The specific times and temperatures can be chosen so the selected polymer mixture is in a low viscosity condition prior to applying pressure in the compression stages.

In another example, after an epoxy-based polymer mixture is mixed at room temperature, the polymer mixture has a generally fixed viscosity for about three hours. Typically the viscosity is about 500 centipoise (the viscosity of light syrup). Although curing begins after mixing, the viscosity does not generally build until after about three hours or when the polymer mixture molecular weight begins to exceed about three times its monomer molecular weight (as initially mixed). To lower a polymer mixture viscosity further (before the polymer mixture builds too much molecular weight), the polymer mixture can be warmed. In one example, the warming temperature is about 80° C.

Although the present invention is described in the specific context of bushings for buses, the concept of applying pressure (preferably under vacuum conditions) to polymer mixtures is broadly applicable to embodiments wherein substantially void free polymer insulation is needed. For example, rolled capacitors often have polymer material potting the capacitor ends. Application of the present invention in this context would prevent arcing in such capacitors. As another example, voids can be dangerous in printed circuit boards or in the dielectric material 18 of buses 16. Another area where the present invention is useful is in potting high voltage devices such as gate turn off thyristors, insulated gate bipolar transistors, integrated gate commutated thyristors, and silicon carbide high voltage devices. Further areas in which the present invention can be used include potting for automotive spark coils and potting for motor windings, for example.

In the embodiment of FIGS. 1 and 2, a bus 16 includes alternating layers of dielectric material 18 and patterned, electrically conductive bus bars 20 and has through holes 22. Typically the alternating layers are laminated. Each through hole 22 has a surface 23 exposing a portion 25 of a respective one of the bus bars 24 (or 124). Typically, bus bars 20 comprise a material such as copper (which may be plated with a protective metal such as nickel), dielectric material 18 comprises a material such as a bisphenol A printed circuit board resin (commonly referred to as FR4), a bisphenol A printed circuit board resin with benzotriazol (commonly referred to as FR5), or GETEK® resin (GETEK is a trade mark of the General Electric Corp.), and the bushings comprise a material such as copper, which may be nickel or gold plated for enhanced polymer adhesion to resist torque and corrosion resistance.

The bus bars are generally patterned to have openings in the areas in which bushings will be inserted with the bar 24 (or 124) to be electrically coupled to the bushing 14 (or 114) having a smaller diameter opening than the other bars 20. When holes are formed by machining, for example, a portion 25 of bar 24 is exposed (FIG. 1). The bus and holes are then cleaned and the bus is baked out to remove moisture and to minimize outgassing of water and residual solvent materials during the bushing insertion process. To further facilitate coupling, portion 25 can be electroplated with a material 29 (FIG. 1). In one embodiment, electroplated material 29 comprises electroless copper or nickel.

Briefly, one fabrication sequence of the present invention includes applying polymer mixture 10 to surface 23 of each through hole 22, inserting bushings 14 in respective through holes 22, and curing the polymer mixture. Cooling the bushings with liquid nitrogen (as described below with a bolt in FIG. 7, for example) is useful for shrinking the bushings prior to insertion. In a preferred embodiment, the insertion results in an interference fit that creates an electrical connection between bushing 14 and bar 24. Preferably the interference fit has a clearance ranging from about 10 micrometers to about 75 micrometers.

After inserting the bushings, excess polymer mixture 26 can be removed. Preferably, bus 16 and bushings 14 and 114 are heated to a temperature of about 40° C. for about five to ten minutes to reflow the polymer mixture 10, and decrystallize any freezing effects of the polymer mixture when in contact with the cooled bushing.

It would be useful facilitate adhesion of the bushings to the polymer mixture and to achieve a chemical and mechanical bond to withstand radial torque on bolts (shown in FIGS. 7 and 8) which are passed through bushings and tightened. If turning a bolt results in turning a bushing, a gap or crack between the bushing and bus can create a path for partial discharges.

In one embodiment of the present invention an adhesion promoting coating 28 is applied to the bushings. Examples of useful coatings include electrically conductive materials with good adhesion properties to polymers such as nickel, titanium, tantalum, and tungsten. An adhesion promoting material can be even more useful if it is oxidized. Oxides of the above materials enhance adhesion between the polymer and metal. Polymer mixtures with flexing agents can minimize stress due to CTE (coefficient of thermal expansion) mismatches between the dielectric material, bus bars, and bushings. Typically copper bushings with a thin coating of adhesion promoting material (from about 300 angstroms to about 30,000 angstroms) produce a favorable oxide for a chemical coupling agent.

As discussed above typically polymer mixture 10 includes a polymer combined with other agents such as coupling agents for improving adhesion, wetting (surfactant) agents for reducing natural surface energies and providing better adhesion, hardening (curing) agents, flexing (elasticity) agents, and/or filler(s). The coupling agent can be either mixed in with the main polymer or applied to a bushing prior to insertion in a through hole, for example.

Several useful coupling agents, for example are 3-GPTS 3-glycidoxy propyl trimethoxsilane coupling agents available from United Chemical Technologies, and 1170 and 1160 silanes available from Silar Corp. The choice of an appropriate coupling agent will depend on the selected polymer. For example, the 1170 silane coupling agent from Silar Corp. is particularly useful with a Bis-A epoxy such as Epon™ 828 epoxy available from Shell Corp., whereas the 1160 silane coupling agent from Silar Corp. is particularly useful with a cycloaliphatic epoxy such as CY 184 epoxy available from Ciba Geigy. A useful wetting agent for example, is a fluoraliphatic polymeric ester surfactant labeled FC430 and available from 3M Corp. Examples of some of the other agents include polyglycol di-epoxide as a flexing agent, an amine catalyst as a hardening agent, and silica flour (fumed and/or micronized silica) as a filler. Fillers are preferably in the 0.5–80% range by weight for an epoxide blend.

In one embodiment, the polymer mixture includes a cycloaliphatic epoxy (CY 225 available from Ciba Geigy) at 100 parts by weight, an anhydride catalyst hardening agent HY 225 available from Ciba Geigy Corp. at 80 parts by weight, and silica flour filler at 270 parts by weight. This embodiment is useful for providing cold crack resistance (with a mean failure of about −45° C.) which is particularly useful for buses that will be stored in and/or used in cold environments and mechanical and thermal shock resistance which is useful for withstanding transport.

In another embodiment, the polymer mixture comprises a mixture of the following materials: Cycloaliphatic glycidyl ester epoxy CY 184 available from Ciba Geigy (10 grams);

polyglycol di-epoxide DER 746 available from Dow Chemical (1 gram—a flexing agent for making the polymer mixture more flexible); a curing agent of an amine catalyst of triethylene tetramine TETA available from Miller-Stephenson Chemical (1.555 grams); an adhesion promoter of 3-glycidoxy propl trimethoxysilane 3-GPTS available from United Chemical Technologies (0.1 grams); and a wetting agent of fluoroaliphatic polymeric esters FC430 available from 3M Corp. (0.02 grams).

After mixing these ingredients, the polymer mixture has a useful working pot life of about three hours before the viscosity rise is such that it will no longer flow. Lowering the amount of curing agent will extend the working time of the polymer mixture. During the working pot life, the polymer mixture is applied around the bushings, the initial vacuum is next applied to remove the trapped gasses, and then pressure is applied to push the polymer mixture into the void regions and to compress and break air bubbles. In parallel, heat can begin to be applied to initially lower the polymer mixture viscosity to improve its flow and then help promote curing to high cross-link density (high molecular weight). A full curing process of about two hours at about 100° C. or about 6 hours at about 80° C. can be performed.

In several other embodiments of the present invention, a defective bushing connection is repaired. The repair can be made either while leaving the bushing in position, or by removing the bushing and inserting the bushing or another busing in the through hole as discussed with respect to the fabrication embodiment above. The above described polymer mixture combinations are particularly useful for these repair embodiments because the curing of the polymer mixtures can be localized. In particular, embodiments using an amine curing agent (verses an anhydride curing agent) have good electrical properties as well as a curing temperature which is lower than temperatures of other polymer materials that are typically present in the bus. Thus the polymer mixture can be cured without inducing undue or unknown stresses in the bus.

Figure 3:
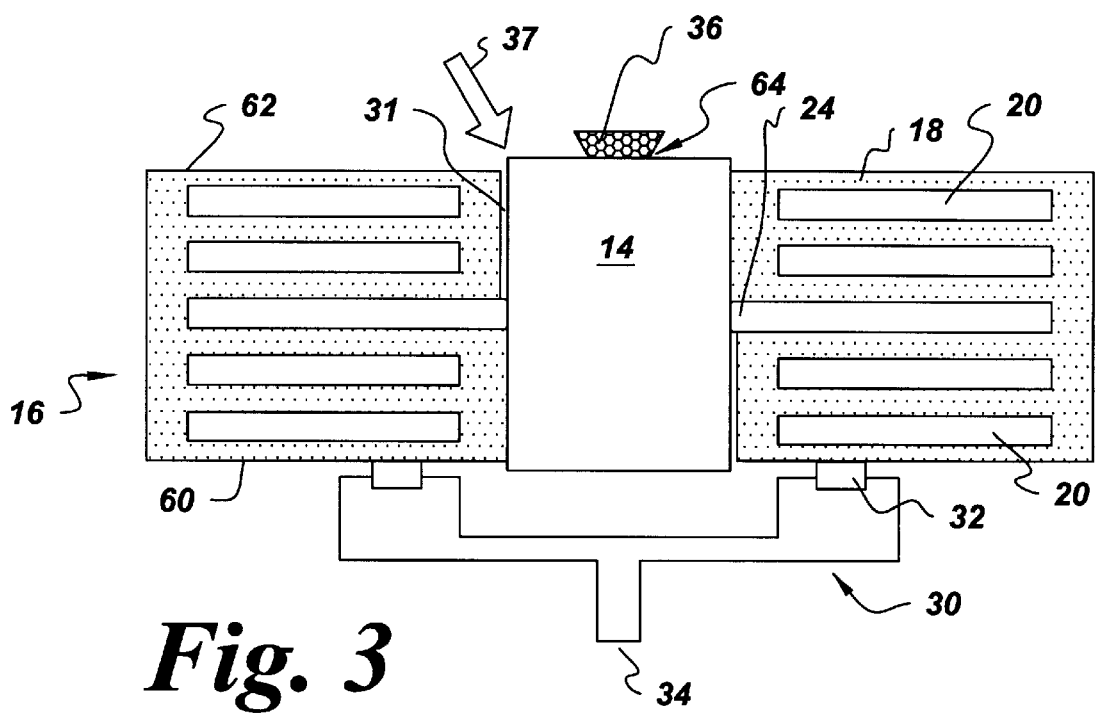
FIG. 3 is a side view of a vacuum arrangement for detecting leaks in bushings and/or for adding polymer mixture around bushings in accordance with another embodiment of the present invention.

FIG. 3 is a side view of a vacuum arrangement for detecting leaks in bushings and/or for adding polymer mixture around bushings in accordance with another embodiment of the present invention. In this embodiment, a vacuum element, designated generally as 30, includes an "O" ring seal 32 and a vacuum application and sensing port 34. By applying a vacuum, injecting a gas such as helium, and detecting whether the gas continues to move with a tester such as a helium ion gage tester (not shown), leaks can be discovered. Other gasses can be used when using an RGA (residual gas analyzer). An alternative method for detecting leaks is to monitor for current arcing.

If current arcing is occurring in a bushing but no leaks are detected using the embodiment of FIG. 3, then a gas such as sulfur hexafluoride ($SF_6$) can be injected into each side of the bushing interface to prevent ionization of the air and temporarily isolate the voids. The polymer mixture can then be flowed into both sides of the busing and bus interface as described below.

One method for reducing voids between an electrically conductive bushing in a bus is to inject the polymer mixture between the bushing and the bus and then cure the polymer mixture, preferably using the vacuum and pressure post-insertion process discussed with respect to FIG. 1. This method permits on site repair of a defective bushing and does not require the removal of the bushing.

The vacuum embodiment of FIG. 3 is useful for injecting the polymer mixture between the bushing and bus. In one embodiment, prior to injecting the polymer mixture on a second side 62 of the bus, a vacuum seal is applied on a portion of a first side 60 of the bus surrounding the one bushing. On second side 62 a hole 64 of the bushing is covered with a stopper 36 comprising a cork, for example. The polymer mixture is then injected from the second side of the bus at a second side pressure while applying a first side pressure with the vacuum seal, with the second side pressure being greater than the first side pressure. Preferably, the second side pressure is about 50–60 psi and the first side pressure is about 15 psi. After the polymer material is injected, the bus can be positioned in a curing chamber and warmed to about 80° C. while vacuum is applied on the unit for a few minutes. Then pressure can be applied to break and/or compress voids. Warming drops the viscosity of the polymer mixture to about 50 centipoise for a short time (water has a viscosity of about 1 centipoise at room temp) before the curing increases the molecular weight and resulting viscosity. Warming can also increase the rate of cure. By lowering the polymer mixture viscosity, trapped gasses are more easily removed between the bushing and bus.

In some situations, vacuum alone, without added pressure, can be used to fix a defective bushing. Such situations are particularly useful in the field. In one embodiment, a small vacuum cup (like a toilet plunger, for example) draws the polymer mixture through the leaking bushing hole. Lowering the temperature of the polymer mixture with a heat lamp or heat gun can lower the polymer mixture viscosity to aid this process. Once the polymer mixture appears on the lower side of the bushing the vacuum can removed and the bus can be left to cure at room temperature (or a heat lamp or gun can be used to decrease the time to cure).

In another embodiment wherein the combination of vacuum and pressure is not used to inject the polymer mixture, bus 16 is first cleaned with alcohol, acetone, or other suitable solvent, for example, and then heated for about 8 to about 12 hours at a temperature of about 90° C. in preparation for the repair. Then a polymer mixture (such as the above described mixture of cycloaliphatic glycidyl ester epoxy, polyglycol di-epoxide, triethylene tetramine, 3-glycidoxy propl trimethoxysilane, and fluoroaliphatic polymeric esters) is injected on one side of the bushing around the bushing edges. The bus is positioned in curing chamber 12 where vacuum is applied for thirty to sixty minutes to remove air from void regions. The chamber is then heated to about 60° C. and pressure is slowly applied to about 50 psi. Before injecting the polymer mixture in the other side, a partial cure (about 1 hour) or a full cure (2–3 hours at about 90° C.) is performed. Next, the bus is slowly cooled to room temperature and any excess polymer mixture is removed. The above steps are then performed for the second side.

Figure 4:
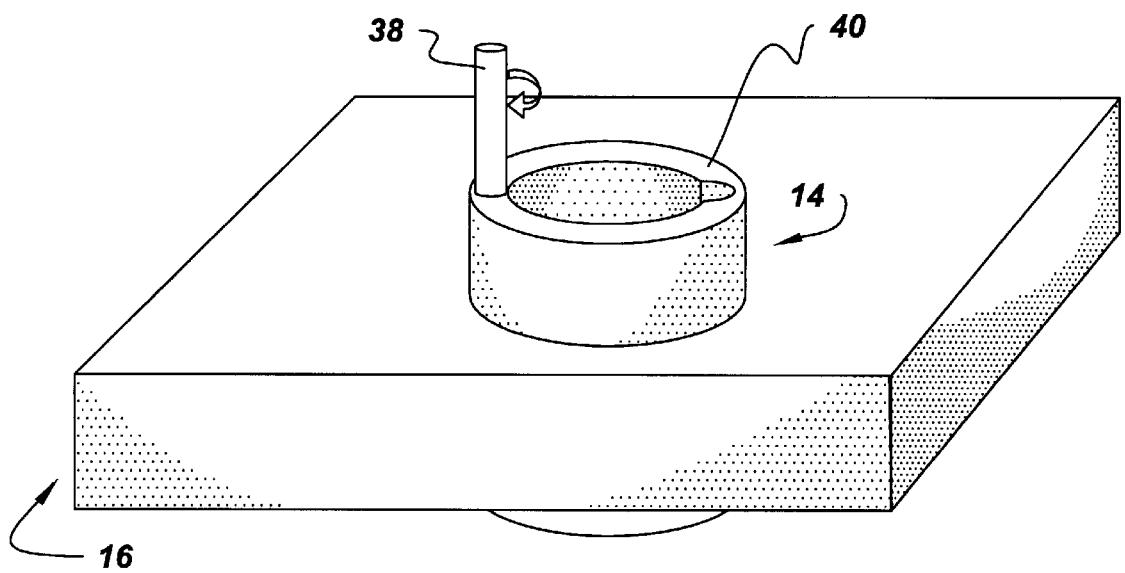
FIGS. 4–6 are perspective views of a technique for removing a defective bushing from a bus according to another embodiment of the present invention.
Figure 5:
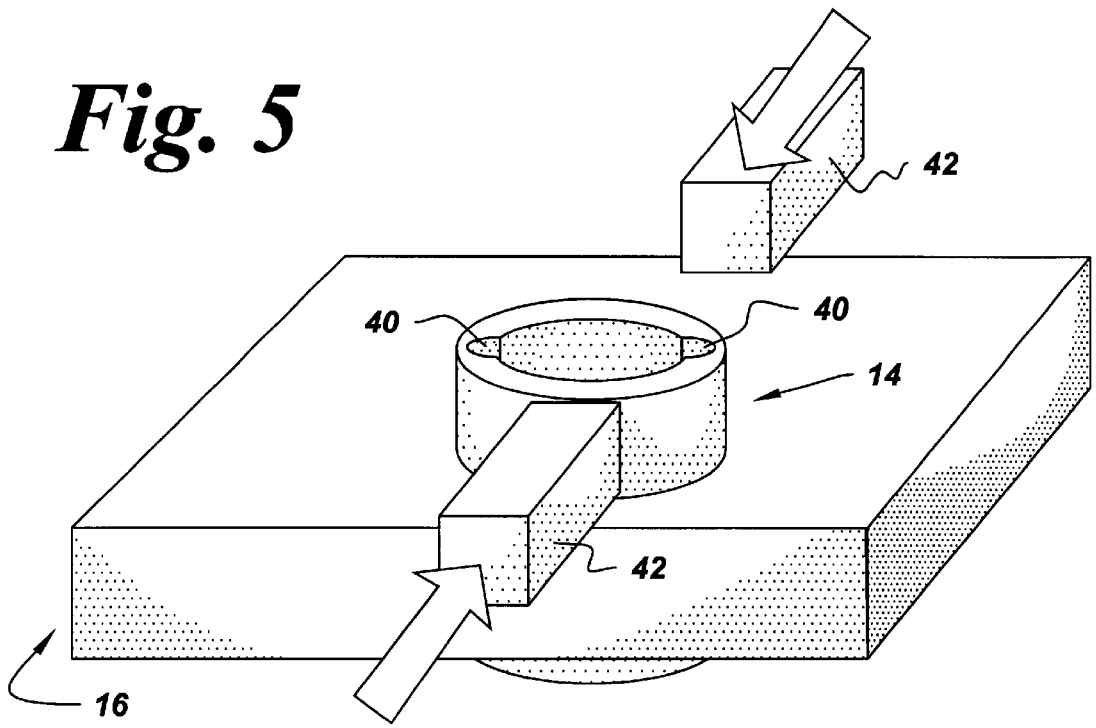
Figure 6:
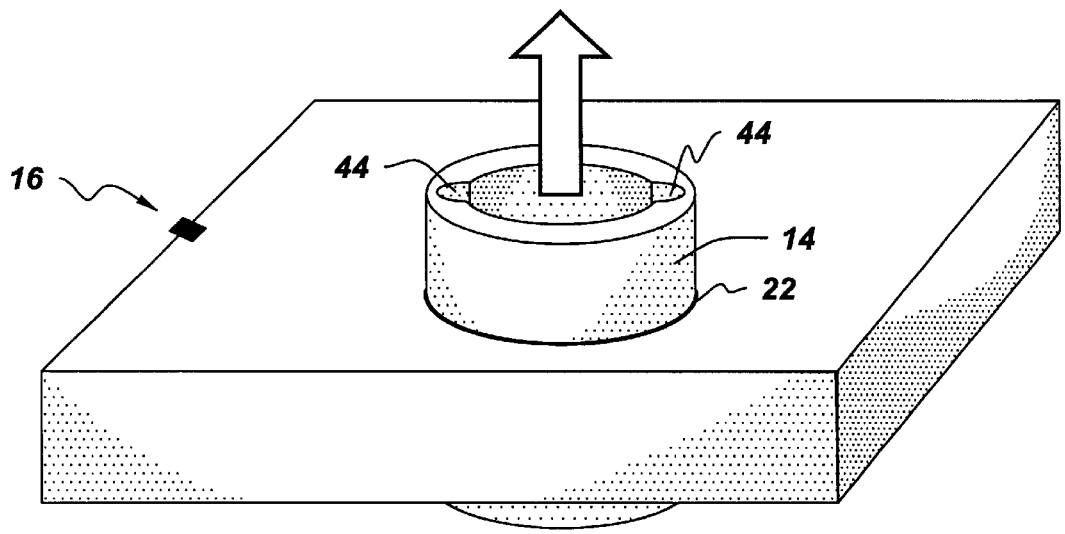
Figure 7:
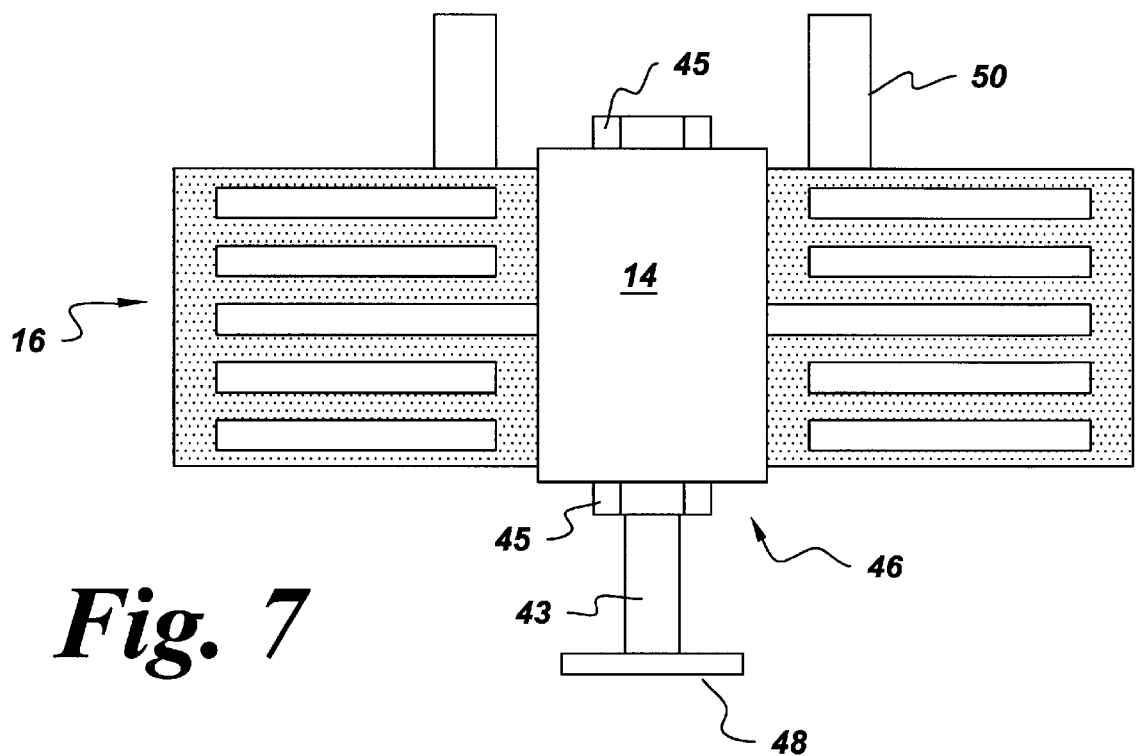
FIGS. 7 and 8 are side views of another technique for removing a defective bushing from a bus according to another embodiment of the present invention.
Figure 8:
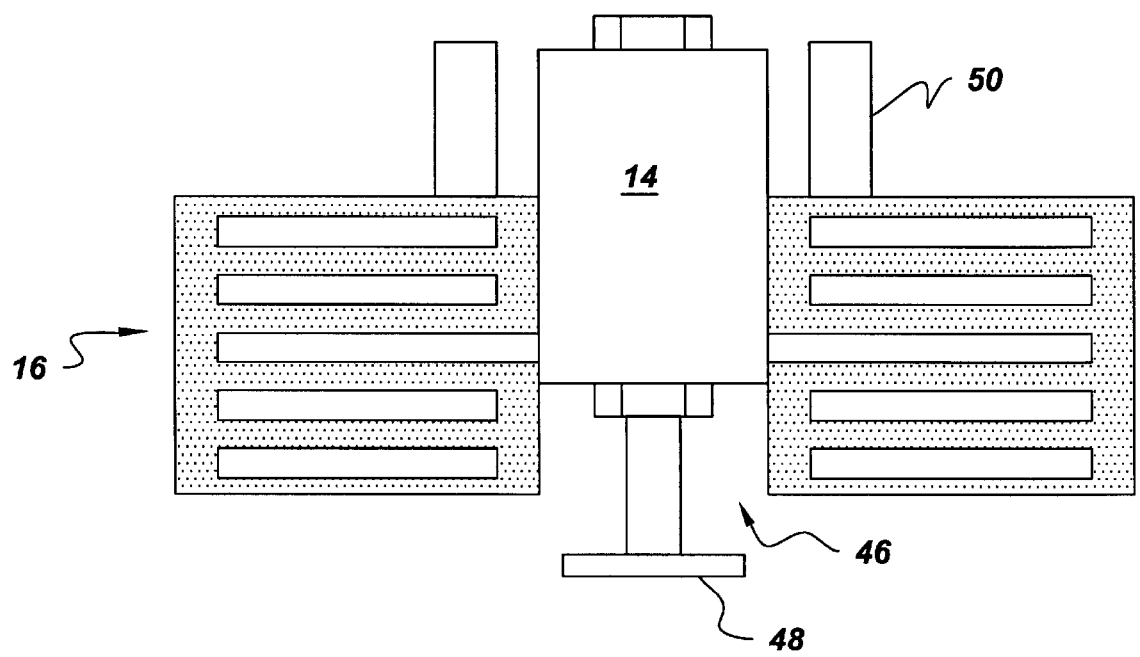

FIGS. 4–8 illustrate embodiments for removing bushing 14 from bus 12. FIGS. 4–6 are perspective views of a technique for removing a defective bushing from a bus according to one embodiment of the present invention. FIGS. 7 and 8 are side views of another technique for removing a defective bushing from a bus according to another embodiment of the present invention.

In FIG. 4, a milling tool 38 is used to create gaps 40 in bushing 14. Creating one or more gaps 40 serves to release pressure and permit a low force removal of the bushing. In the example of FIG. 5, the bushing is compressed by compressor 43 (which may be a tool, a machine or an operator's hand, for example). Thus, compressed gaps 44 are formed, as shown in FIG. 6, and the bushing, which collapses on itself (becomes smaller than through hole 22) and is released from the sides of the bus, can be easily removed.

In FIGS. 7 and 8, the bushings are released from tight interference fits by cooling through a cooling assembly 46 which in one embodiment comprises a bolt 43 secured through nuts 45. The bushing can be cooled, for example, by dipping bolt 43 in liquid nitrogen. When a bushing is sufficiently cooled it shrinks and can be more easily removed from the bus by pressing at press out point 48. A pressure sleeve 50 is useful for reducing pressure on bus 16.

If a bushing is attached to a bus by an adhesive, the embodiment of FIGS. 4–6 is preferred. In such embodiments, heat can be applied to assist in softening the polymer mixture. To soften the polymer mixture, heat can be applied to raise its temperature to a value near its glass transition point. For the epoxy blend including triethylene tetramine described above with the polyglycol di-epoxide flexing agent, the glass transition point about 130° C. Epoxies have a broad range of glass transition values, but for most of the common, commercially available blends, the glass transition point would not exceed 180° C. Care should be exercised to heat the epoxy locally, such as by heating the bushing alone to soften the surrounding epoxy. Heating the entire board to high temperature may cause stress and warpage.

Alternatively, using a heat sink to cool the adhesive can cause it to become brittle and shatter to break the bond and permit removal.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for coupling electrically conductive bushings in a bus including alternating layers of dielectric material and patterned, electrically conductive bus bars, the bus having through holes therein, each through hole having a surface exposing a portion of a respective one of the bus bars, the method comprising:

applying a polymer mixture to the surface of each through hole;

inserting the bushings in the respective through holes;

applying pressure to reduce voids in the polymer mixture and between the bus and the bushings; and then curing the polymer mixture.

2. The method of claim 1 wherein inserting the bushings in the respective through holes comprises force-fitting the bushings in the respective through holes.

3. The method of claim 2 further including, prior to inserting the bushings in the respective through holes, electroplating the exposed portions of the bus bars in the through holes.

4. The method of claim 1 wherein the polymer mixture is applied to the surface of each through hole prior to inserting the bushings.

5. The method of claim 1, further including positioning the bus and bushings in a vacuum chamber and alternately applying vacuum and pressure conditions over multiple cycles within the vacuum chamber.

6. The method of claim 5 further including applying heat within the vacuum chamber.

7. The method of claim 5 wherein the polymer mixture is an epoxy, a silicone, a polyimide, a polyurethane, or a polyester.

8. The method of claim 7 wherein the polymer mixture further includes at least one of a coupling agent, a hardening agent, a wetting agent, a flexing agent, and filler material.

9. The method of claim 1 further including applying pressure while curing the polymer mixture to minimize further void formation in the polymer mixture.

10. A method for reducing voids between an electrically conductive bushing and a bus including alternating layers of dielectric material and patterned, electrically conductive bus bars, the bus having at least one through hole therein with a surface exposing a portion of a respective one of the bus bars, the at least one bushing being situated in the at least one through hole in electrical, interference fit contact with the respective one of the bus bars, the method comprising:

injecting polymer mixture between the at least one bushing and the bus;

applying pressure to reduce voids in the polymer mixture and between the bus and the bushings; and then curing the polymer mixture.

11. The method of claim 10 further including, prior to injecting the polymer mixture, applying a vacuum seal on a portion of a first side of the bus surrounding the at least one bushing, and covering a hole of the at least one bushing on a second side of the bus.

12. A method for reducing voids between an electrically conductive bushing and a bus including alternating layers of dielectric material and patterned, electrically conductive bus bars, the bus having at least one through hole therein with a surface exposing a portion of a respective one of the bus bars, the at least one bushing being situated in the at least one through hole in electrical, interference fit contact with the respective one of the bus bars, the method comprising:

first injecting a polymer mixture into a first side of the bus surrounding the at least one bushing;

at least partially curing the first injected polymer mixture;

second injecting the polymer mixture into a second side of the bus surrounding the at least one bushing;

applying pressure to reduce voids in the first and second injected polymer mixtures and between the bus and the bushings; and then curing the first and second injected polymer mixtures.

13. The method of claim 12 further including, prior to completely curing the first and second injected polymer mixtures, applying a vacuum to the bus and bushing.

14. The method of claim 13 further including, while applying the vacuum, heating the first and second injected polymer mixtures to lower the viscosity of the first and second injected polymer mixtures.

15. The method of claim 10 wherein the polymer mixture includes at least one of a coupling agent, a hardening agent, a wetting agent, a flexing agent, and filler material.

16. The method of claim 10 further including applying pressure while curing the polymer mixture to minimize further void formation in the polymer mixture.

* * * * *